United States Patent [19]
Gagnon et al.

[11] Patent Number: 6,147,353
[45] Date of Patent: Nov. 14, 2000

[54] IMAGE SHIFT FOR GAMMA CAMERA

[75] Inventors: Daniel Gagnon, Twinsburg; Christopher G. Matthews, Lyndhurst; Frank P. DiFilippo, Strongsville, all of Ohio

[73] Assignee: Picker International, Inc., Cleveland, Ohio

[21] Appl. No.: 09/086,947

[22] Filed: May 29, 1998

Related U.S. Application Data

[60] Provisional application No. 60/048,214, May 30, 1997.

[51] Int. Cl.[7] .................................................. G01T 1/166
[52] U.S. Cl. ........................... 250/363.05; 250/363.04; 250/363.08
[58] Field of Search ................... 250/363.05, 363.08, 250/363.04

[56] References Cited

U.S. PATENT DOCUMENTS

| | | |
|---|---|---|
| 3,979,594 | 9/1976 | Anger . |
| 4,197,460 | 4/1980 | Anger . |
| 4,213,054 | 7/1980 | Doherty, III . |
| 4,888,486 | 12/1989 | Plummer et al. . |
| 5,691,538 | 11/1997 | Ohike et al. ..................... 250/363.05 |

FOREIGN PATENT DOCUMENTS 2 697 918  5/1994  France .

*Primary Examiner*—Constantine Hannaher
*Attorney, Agent, or Firm*—Timothy B. Gurin; John J. Fry

[57] ABSTRACT

A gamma camera includes first and second detectors which face an examination region. The detectors are rotatable about the examination region and translatable in a direction tangential to the examination region. Translation of the detectors is coordinated with the rotation of the detectors about the examination so as to increase the effective field of view of the detectors. In a first embodiment, the detectors are translated in the transverse direction when the detectors are located at each of a plurality of positions about the examination region. In a second embodiment, translation of the detectors is coordinated such that, for a given projection angle, the first detector is used to detect radiation data from a subset of the region of interest.

20 Claims, 5 Drawing Sheets und 6,147,353

IMAGE SHIFT FOR GAMMA CAMERA

The present application claims priority to U.S. Provisional Application Ser. No. 60/048,214 filed on May 30, 1997.

BACKGROUND OF THE INVENTION

The present invention relates to the art of diagnostic imaging. It finds particular application in conjunction with nuclear or gamma cameras and will be described with particular reference thereto. It is to be appreciated, however, that the present invention will also find application in other non-invasive investigation techniques and imaging systems such as single photon planar imaging, whole body nuclear scans, positron emission tomography (PET) and other diagnostic modes.

In diagnostic nuclear imaging, one or more radiation detectors are mounted on a movable gantry to view an examination region which receives a subject therein. Typically, one or more radiopharmaceuticals or radioisotopes capable of generating emission radiation are injected into the subject. The radioisotope preferably travels to an organ of interest whose image is to be produced. The detectors scan the subject along a selected path or scanning trajectory and radiation events are detected on each detector.

Typically, the detector includes a scintillation crystal that is viewed by an array of photomultiplier tubes. The relative outputs of the photomultiplier tubes are processed and corrected, as is conventional in the art, to generate an output signal indicative of (1) a position coordinate on the detector head at which each radiation event is received, and (2) an energy of each event. The energy is used to differentiate between various types of radiation such as multiple emission radiation sources, stray and secondary emission radiation, transmission radiation, and to eliminate noise. A two-dimensional image representation is defined by the radiation data received at each coordinate. The radiation data is then reconstructed into an image representation of a region of interest.

Detecting radiation with two detector heads oppositely disposed from each other improves the resolution and data collection efficiency, particularly for whole body imaging. For other studies, particularly cardiac studies, it is advantageous to position the detector heads orthogonally to each other. This enables a complete 180 degree data set to be collected by rotating the pair of detector heads only 90 degrees relative to the subject. Still other gamma cameras have three heads placed at 120 degree intervals around the subject. Typically, the heads are movable radially toward and away from the patient and the three heads are rotatable, as a unit, around the patient. In each case, the detector face is placed as close as possible to the patient during a diagnostic scan for collimated imaging. The close proximity is necessary to minimize the loss in spatial resolution due to collimator blur.

Each of the foregoing systems has various advantages and disadvantages. The cost of a gamma camera system increases as additional detector heads are added. Systems having two opposed detector heads are particularly useful for whole-body imaging. Wide field of view detectors, which permit scanning of the entire width of the body, are preferably used in this application. Systems having two orthogonal detectors are commonly used for cardiac imaging. Because a wide field of view is not required in cardiac applications, smaller detectors are preferably used to allow the detectors to be placed as close as possible to the patient.

Three detector head systems are often used in connection with high sensitivity brain and cardiac imaging. Although wide field of view detectors are desirable for body imaging, their physical size again limits performance in head imaging. Because the large detectors cannot be placed as close as possible to the patient's head, the system spatial resolution is compromised. The placement of the three detector heads also limits the utility of three detector systems in whole body and brain applications. Furthermore, as the detectors are moved, their associated field-of-view and resolution may change resulting in inaccurate collection of data and inaccurate reconstruction of images.

The present invention provides a new and improved diagnostic imaging system and method which overcomes the above-referenced problems and others.

SUMMARY OF THE INVENTION

In accordance with the present invention, a diagnostic imaging method utilizes a gamma camera having first and second detectors disposed in a relative angular orientation with respect to an examination region. The first and second detectors have respective first and second radiation sensitive faces which face the examination region and first and second transverse fields of view, and the region of interest extends beyond the fields of view. The method includes the steps of using the first and second detectors to detect radiation indicative of radionuclide decays occurring within the examination region, and rotating the first and second detectors about the examination region. The steps of using and rotating are repeated a plurality of times so as to detect radiation with the first and second detectors located at a plurality of projection angles. In coordination with the rotation of the first and second detectors about the examination region, the first and second detectors are moved in a transverse direction so that, at each of the projection angles, the effective transverse field of view of the first and second detectors includes the region of interest. An image indicative of the detected radiation, for example a conventional SPECT image which includes one or more image slices orthogonal to the longitudinal axis of a patient, is generated.

According to a more limited aspect of the present invention, the method includes positioning the first and second detectors at first and second transverse positions at a plurality of the projection angles.

According to a still more limited aspect of the present invention, at a plurality of the projection angles, the first detector is translated between a first position wherein the first detector's field of view extends to at least a perimeter of the region of interest and a second position wherein the first detector's transverse field of view extends to at least an opposite perimeter of the region of interest.

According to another still more limited aspect, the detectors are disposed in a ninety degree configuration.

According to another more limited aspect of the invention, the first and second detectors each generate a signal indicative of an axial and transverse position on the face of the detector at which radiation is detected. According to another more limited aspect, the method includes reconstructing a plurality of parallel image slices indicative of the detected radiation.

According to another more limited aspect of the present invention, the method includes, rotating the first and second detectors about the examination region so that the first detector is located at a first projection angle and the second detector is located at a second projection angle, utilizing the first detector to detect radiation indicative of radionuclide decays occurring within the examination region, a first portion of the region of interest being located outside the first detector's field of view, rotating the first and second detectors about the examination region so that the second detector is located at the first projection angle, positioning the second detector so that the first portion of the field of interest is within the second detector's field of view, and utilizing the second detector to detect radiation indicative of radionuclide decays occurring within the examination region.

According to a still more limited aspect of the invention, the first and second detectors are disposed in a 180 degree opposed configuration.

According to yet another still more limited aspect of the present invention, the method includes the steps of, with the second detector located at the second projection angle, utilizing the second detector to detect radiation indicative of radionuclide decays occurring within the examination region, a second portion of the region of interest being located outside the second detector's field of view, rotating the first and second detectors about the examination region so that the first detector is located at the second projection angle, positioning the first detector so that the second portion of the region of interest is within the first detector's field of view, and utilizing the second detector to detect radiation indicative of radionuclide decays occurring within the examination region.

According to another aspect of the present invention, a diagnostic imaging method utilizes a gamma camera having a detector which includes a radiation sensitive face which faces an examination region. The detector has a transverse field of view. The method includes using the detector to detect radiation indicative of radionuclide decays occurring within the examination region, rotating the detector about the examination region, repeating the steps of utilizing and rotating a plurality of times so as to detect radiation with the detector located at a plurality of projection angles, and generating an image indicative of the detected radiation. At a plurality of the projection angles, the detectors are placed in first and second transverse positions whereby the effective transverse field of view of the detector is greater than the actual transverse field of view of the detector.

According to a more limited aspect, a parallel hole collimator is disposed between the radiation sensitive face and the examination region.

One advantage of an embodiment of the first invention is that radiation data is accurately collected in accordance with current field-of-views of each detector.

Another advantage is that the effective field of view of the detectors may be advantageously increased.

Another advantage is that the size of the radiation sensitive detectors may be decreased. Another advantage is that a larger region of interest may be examined than was heretofore possible.

Yet another advantage is that greater flexibility in obtaining images is available.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
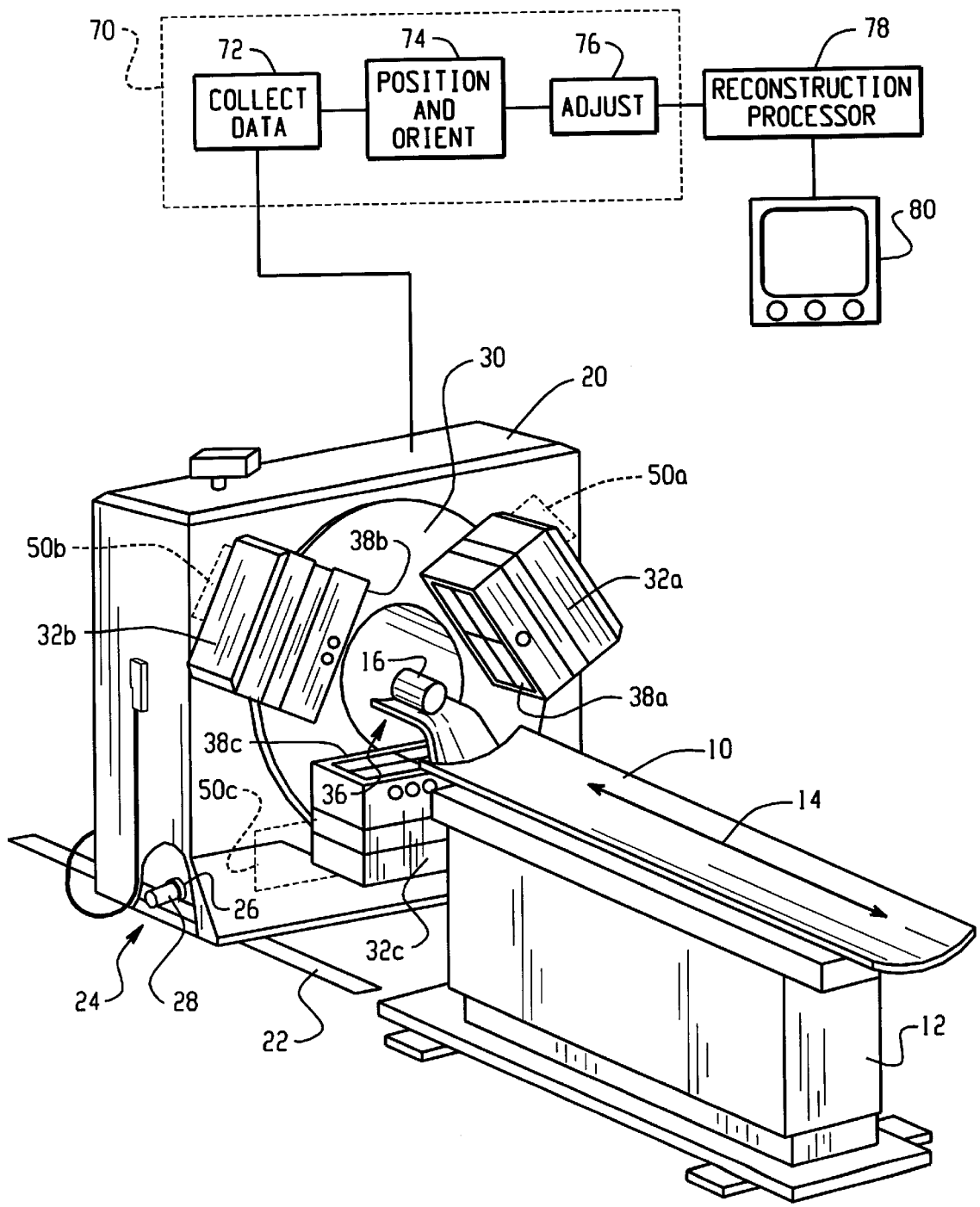
FIG. 1 is a diagrammatic illustration of a diagnostic imaging system in accordance with the present invention.

With reference to FIG. 1, a diagnostic imaging system includes a subject support or table 10 which is mounted to stationary, vertical supports 12 at opposite ends. The subject table is selectively positionable up and down to center a subject 16 in the center of a circle along a longitudinal axis 14.

An outer gantry structure 20 is movably mounted on tracks 22 which extend parallel to the longitudinal axis. This enables the outer gantry structure to be moved parallel to the longitudinal axis 14. An outer gantry structure moving assembly 24 is provided for selectively moving the outer gantry structure 20 along the tracks 22 in a path parallel to the longitudinal axis. In the illustrated embodiment, the longitudinal moving assembly includes drive wheels 26 for supporting the outer gantry structure on the tracks. A motive power source, such as a motor 28, selectively drives one of the wheels which frictionally engages the track and drives the outer gantry structure and supported inner gantry structure and detector heads therealong. Alternately, the outer gantry can be stationary and the subject support configured to move the subject along the longitudinal axis.

An inner gantry structure 30 is rotatably mounted on the outer gantry structure 20. A first camera or radiation detector head 32a is mounted to the inner gantry structure. Second and third radiation detector heads 32b, 32c are mounted to the inner gantry structure orthogonal to the first camera head. Of course, the detectors may be positioned to oppose each other at any angle suitable for detecting radiation. It is to be further appreciated that a greater or lessor number of detectors can be provided and detectors having non-planar radiation receiving surfaces can be used. The detectors 32a, 32b, 32c detect radiation, the type of which depends on the type of imaging performed. The inner gantry structure defines a central, subject receiving examination region 36 for receiving the subject table and, particularly along the longitudinal axis. The examination region 36 is enlarged to receive the detector heads in any of a variety of displacements from a central axis and angular orientations.

The detectors each include a scintillation crystal disposed behind a radiation receiving face 38a, 38b, 38c, respectively, that is viewed by an array of photomultiplier tubes. In SPECT imaging, a collimator (such as a parallel hole collimator) is disposed between the radiation receiving face and the examination region so as to limit the acceptance angle of radiation received by the face. The scintillation crystal emits a flash of light in response to incident radiation. The array of photomultiplier tubes convert the light into electrical signals. A resolver circuit resolves the x,y-coordinates of each light flash and the energy of the incident radiation. The relative outputs of the photomultiplier tubes are processed and corrected, as is conventional in the art, to generate an output signal indicative of a position coordinate on the detector head at which each radiation event is received, and an energy of each event. A data collection processor collects and processes the radiation data in accordance with the type of radiation received. It is to be appreciated that a collimator may be mounted on the detectors in accordance with the type data desired to be collected.

To increase the image quality obtained during a diagnostic scan, the radiation detectors are positioned as close as possible to a region of interest of the subject. To position the radiation detectors in desired orientations and distances from the subject, a motor and drive assembly 50a, 50b, 50c is connected to each detector, respectively, which includes means for canting, shifting, and zooming the detectors in and out from the subject, for example, as described in U.S. Pat. No. 5,838,009 which issued on Nov. 17, 1998 and is assigned to the present assignee, expressly incorporated by reference herein. Alternately, a single motor and drive assembly controls movement of all detector heads individually or as a unit.

Figure 2:
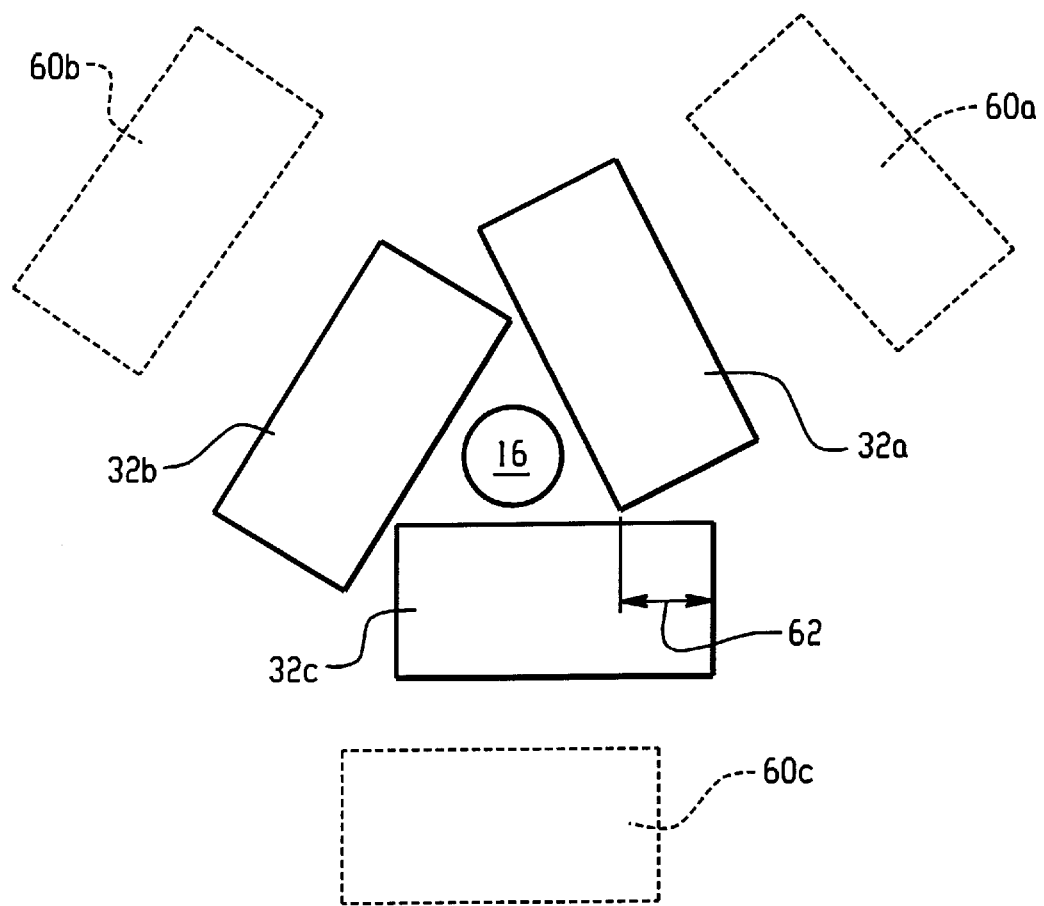
FIG. 2 is an illustration of three detectors moved in an iris-type motion.

With reference to FIG. 2, an example of the three detector camera is shown where the three detectors 32a, 32b, 32c have been zoomed-in and shifted in an iris-type motion from their original positions 60a, 60b, 60c, respectively, represented by the dotted fines. The new orientation of the three detectors results in portions of each detector to be overlapped by another detector such as area 62 of detector 32c. In other words, a field-of-view of each detector is reduced such that areas of a detector within the field-of-view are active areas and areas outside the field-of-view are inactive areas. In their original positions 60a, 60b, 60c, the detectors are configured to receive radiation over their entire radiation receiving surface which has predefined field-of-view and a predefined resolution. However, once the detectors are zoomed and shifted, the field-of-view, the resolution and associated correction such as for center-of-rotation are correspondingly changed and the radiation received can no longer be processed correctly under the original field-of-view, resolution and correction parameters.

With reference again to FIG. 1, to compensate for the new orientation of the detectors, a data collection processor 70 is linked with the motor and drive assemblies 50a, 50b, 50c of each detector so that position and orientation data of each detector is communicated to the data collection processor. The data collection processor collects radiation data 72 and includes a means 74 for determining the field of-view or active area of each detector and a suitable resolution based on the position and orientation data. Areas of each detector which are overlapped by another detector or are simply outside the field-of-view are referred to as inactive areas and are also determined. It is assumed that radiation received, if any, by inactive areas is unsuitable for image reconstruction and is therefore filtered out using any known filtering algorithm. In other words, radiation data collected at coordinate positions on a detector falling within an inactive area of a detector is disregarded.

The remaining radiation data which is collected by active areas is adjusted 76 based on the adjusted field-of-view of each detector. Similarly, the resolution of each radiation detector is adjusted based on the current active area and field-of-view of each detector. A reconstruction processor 78 then reconstructs the adjusted radiation data into an image representation 80 into a human readable form in accordance with any known reconstruction or tomographic algorithm.

Figure 3A:
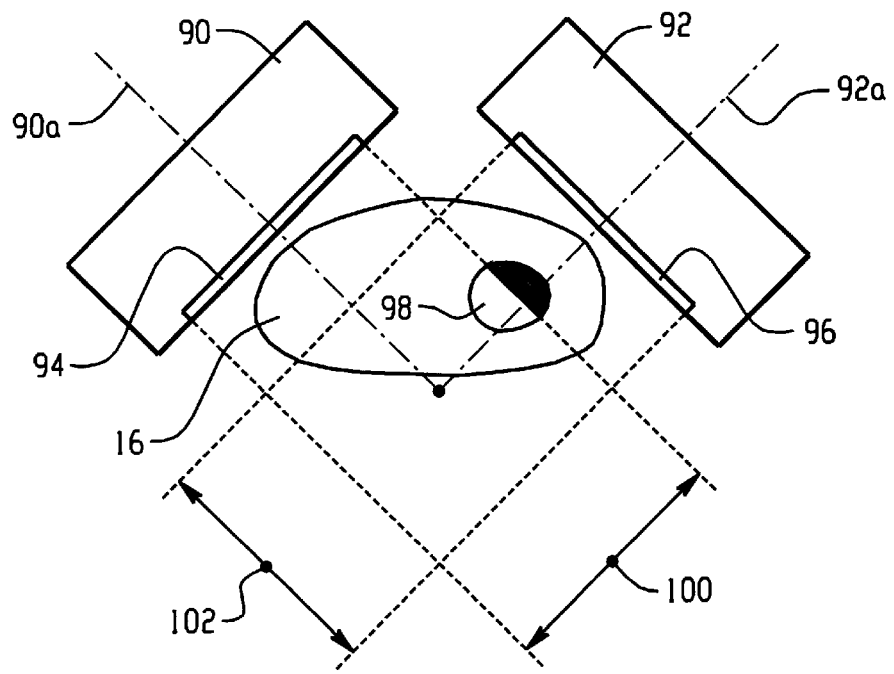
FIG. 3A is an example of two detectors positioned at right angles to each other where a region of interest does not fall within their field-of-views.

With reference to FIG. 3A, an alternative diagnostic system is shown including two radiation detectors 90, 92 positioned at a 90° angle to one another which are rotated around the subject 16 during a scan. In FIG. 3A, the detectors 90, 92 are positioned in a conventional arrangement where they are aligned with their respective mechanical center-of-rotation axes 90a and 92a. The detectors are not translated with respect to each other. Each detector receives radiation over an active area 94 and 96 which does not cover the entire surface of the respective radiation receiving faces of each detector due to mechanical structural limitations. Typically, a region of interest 98 within the subject 16 does not completely fall within the field-of-views of each detector where the field-of-views are represented by 100 and 102 for detectors 90 and 92, respectively. The shaded area of the region of interest 98 is shown to be outside the field-of-views of the detectors.

Figure 3B:
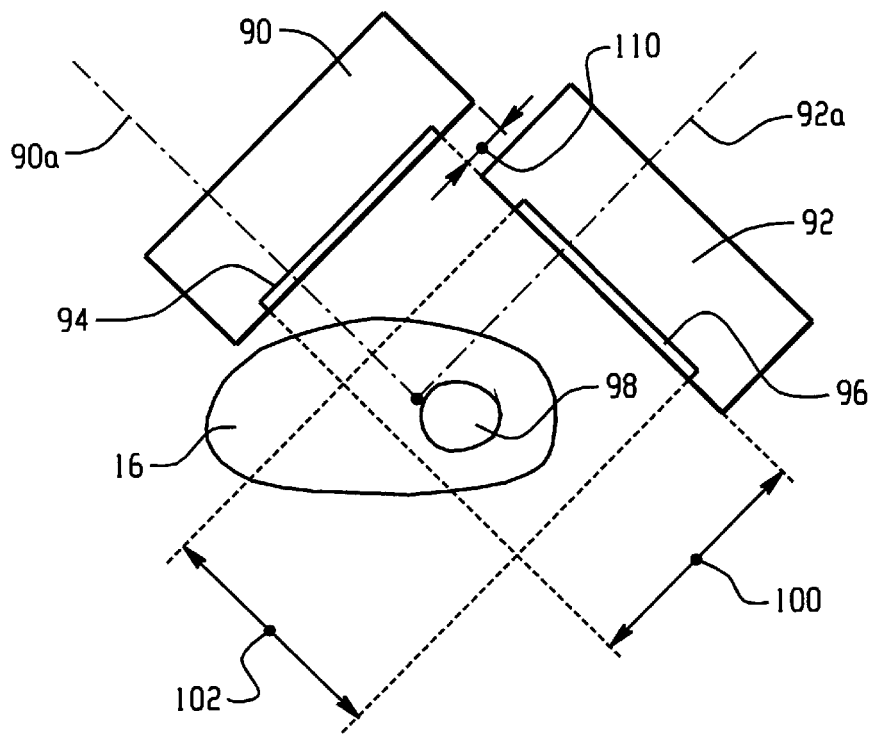
FIG. 3B is an example of the two detectors of FIG. 3A translated such that the region of interest falls within their field-of-views in accordance with the present invention.

With reference to FIG. 3B, the detectors 90, 92 are translated with respect to each other thereby creating an overlapped region 110 on detector 90. The translation movement shifts the field-of-views 100, 102 of the detectors so that the region of interest 98 completely falls within the field-of-views. Projection data is generated based on the radiation data collected during the scan.

Figure 4:
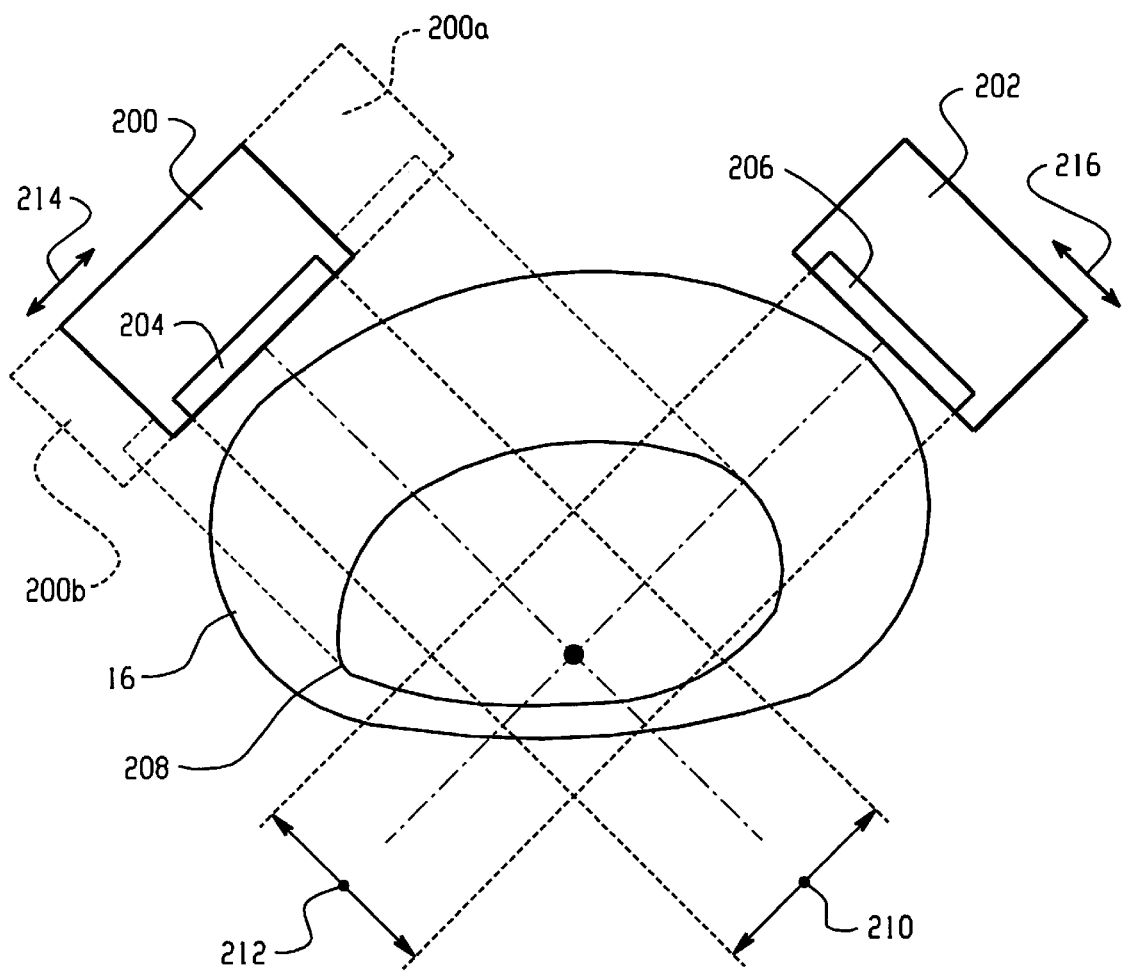
FIG. 4 is an example of two detectors positioned at right angles to each other with a region of interest larger than the detectors' fields of view.

Turning now to FIG. 4, a system having two detectors 200, 202 positioned at a 90 degree relative angular orientation is shown. With the detectors 200, 202 in the positions shown by the solid lines, the centers of the fields of view coincide with the center of rotation. Each detector 200, 202 receives radiation over an active area 204, 206 which is smaller than the width of the front face of the detector. Again, a region of interest 208 within the subject extends beyond the transverse field of views 210, 212 of the respective detectors 200, 202.

It is desirable that the detectors 200, 202 receive radiation from the entire region of interest 208, even though its dimension is greater than the fields of view 210, 212 of the respective detectors. To accomplish this, the detectors are translated in a direction tangential to the examination region 36 as indicated by the arrows 214, 216 so that each detector receives data corresponding to the entire region of interest. In a first extreme position 200a, the detector 200 is translated to a first transverse position wherein the edge of its field of view 210 extends at least to the perimeter of the region of interest 208. In a second extreme position 200b, the detector 200 is translated to a second transverse position wherein the edge of its field of view 210 extends at least to the opposite perimeter of the region of interest 208. Radiation may be collected continuously as the detector 200 is being translated. The translation velocity may be constant, or the transverse velocity of the detector 200 may be varied as a function of transverse position so as to provide a desired transverse sensitivity profile. Sensitivity in the regions near the first and second extreme positions 200a, 200b may be enhanced by reducing the transverse velocity relative to more median positions. Similarly, sensitivity in the more median positions may be increased by reducing the transverse velocity in those areas. In particular, the transverse velocity may be selected to increase the relative transverse sensitivity in regions where the object exhibits relatively high attenuation characteristics or to reduce the relative sensitivity where the object exhibits relatively lower attenuation. Thus, the attenuation provided by the object in the transverse direction may be estimated and the transverse velocity profile adjusted based on known characteristics of the object (e.g., thickness and/or composition or by direct measurement) so that the relative transverse sensitivity profile is complementary thereto. Alternately, however, the detector 200 may be moved to one or more discrete positions with radiation data collected at each. The relative sensitivity profile may be adjusted by varying the time during which data is collected at each of the positions. While the foregoing discussion has focused on the detector 200, it is equally applicable to the detector 202.

Translation of the detectors 200, 202 is preferably conducted in coordination with rotation of the detectors about the examination region 36 to a plurality of projection angles, for example in a conventional circular or elliptical orbit. The detectors are translated in an amount sufficient to obtain a complete data set covering the region of interest for each projection angle. Depending on the shape of the region of interest and the size of the field of view, the magnitude of the requisite translation may vary as a function of the projection angle. In fact, translation may not be required at one or more of the projection angles.

As data is collected, the tangential position of the detectors is determined. The data collection processor 70 uses this information to determine the transverse coordinate on the face of the detector 200, 202 at which radiation was received. In this way, a data set representative of a field of view larger than the transverse field of view 210, 212 is generated. The data is used by the reconstruction processor 78 to reconstruct a human readable image as is conventional in the art. While the foregoing discussion focuses on a gamma camera having two detectors in a 90 degree configuration, it is equally applicable to gamma cameras having two detectors disposed in other relative angular orientations or having three or more detectors. The technique may also be implemented using a gamma camera having a single detector.

Figure 5A:
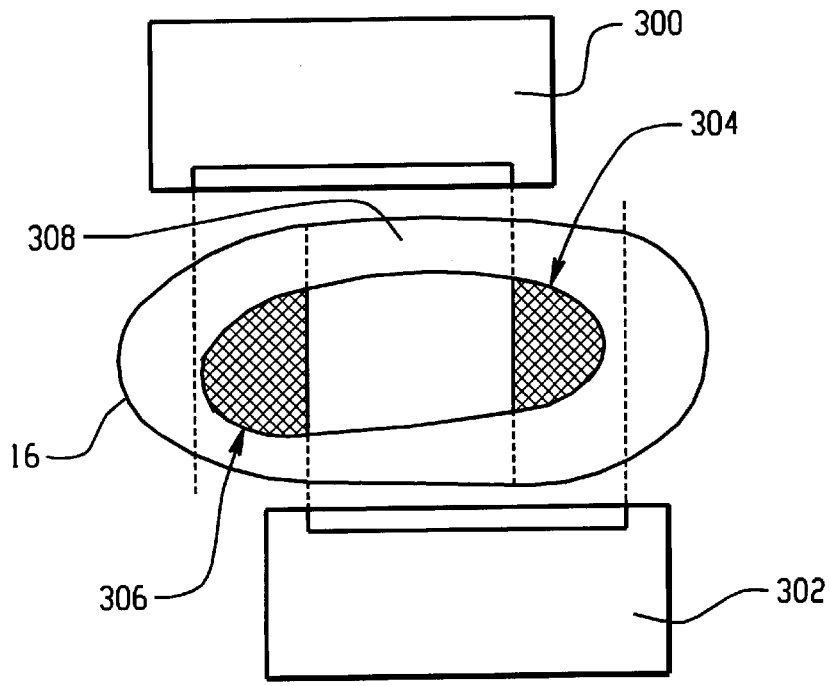
FIG. 5A is an example of two detectors positioned in an opposed configuration with a region of interest larger than the detectors' fields of view.

Turning now to FIG. 5A, 180 degree opposed first 300 and second 302 detectors are disposed at respective first and second projection angles. As shown in FIG. 5A, the detectors are offset in a transverse direction so that the centers of their respective fields of view do not coincide with the center of rotation. A portion 304 of the region of interest 308 extends beyond the field of view of the first detector 300. Likewise, a portion 306 of the region of interest 308 extends beyond the field of view of the second detector 302.

Figure 5B:
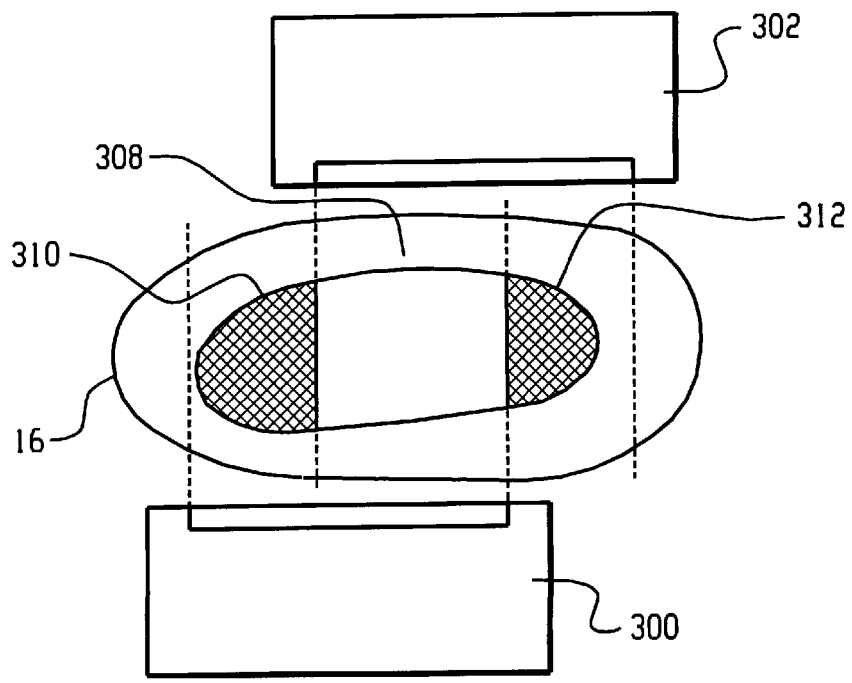
FIG. 5B is an example of the two detectors of FIG. 5A rotated about the examination region and translated tangentially with respect to the imaging region.

Turning to FIG. 5B, translation of the detectors 300, 302 is coordinated with rotation about the examination region. As shown in FIG. 5B, the first 300 and second detectors have been rotated about the examination region by 180 degrees and translated tangentially with respect to the imaging region. Again, a portion 312 of the region of interest 308 extends beyond the field of view of the first detector 300. A portion 310 of the region of interest likewise falls outside the field of view of the second detector 302. However, it will be appreciated that, at the second projection angle, the first detector is positioned so that it receives data from the portion 306 of the region of interest 308 outside the field of view of the second detector 302 prior to rotation. Likewise, at the first projection angle, the second detector 302 is positioned so that it receives data from the portion 304 of the region of interest 308 outside the field of view of the first detector 300 prior to rotation. Corresponding data from the first and second projection angles can then be combined to form a complete data set. Thus, a complete data set may be collected even though, for a given projection angle, data is collected with the detectors located at only a single tangential position. It will, of course, be appreciated that FIGS. 5A and 5B depict only two of a multiplicity of projection angles at which data is collected. While the foregoing discussion focuses on a gamma camera having two detectors disposed in a 180 degree configuration, it is equally applicable to gamma cameras having two detectors disposed in other relative angular orientation or having three or more detectors.

Typical image reconstruction reconstructs the projection data based on the center-of-rotation. However, the translation causes the detectors to be offset from the center of rotation. Thus, to reconstruct an accurate image, the projection data is adjusted in accordance with the offset positions at which the projection data was collected. Once adjusted, the reconstruction processor 78 reconstructs the adjusted radiation data and generates an image representation 80 in a human readable form.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A diagnostic imaging method utilizing a gamma camera having first and second detectors disposed in a relative angular orientation with respect to an examination region, the first and second detectors having respective first and second radiation sensitive faces which face the examination region and first and second transverse fields of view, a region of interest within the examination region having a dimension greater than the first and second transverse fields of view, the method comprising:

utilizing the first and second detectors to detect radiation indicative of radionuclide decays occurring within the examination region;

rotating the first and second detectors about the examination region;

repeating the steps of utilizing and rotating a plurality of times so as to detect radiation with the first and second detectors located at a plurality of projection angles;

in coordination with the rotation of the first and second detectors about the imaging region, moving the first and second detectors in a transverse direction so that, at each of the projection angles, the effective transverse field of view of the first and second detectors includes the region of interest;

reconstructing an image indicative of the detected radiation.

2. The method of claim 1 including positioning the first and second detectors at first and second transverse positions at a plurality of the projection angles.

3. The method of claim 2 wherein, at the plurality of the projection angles, the first detector is translated between a first position wherein the first detector's transverse field of view extends to at least a perimeter of the region of interest and a second position wherein the first detector's transverse field of view extends to at least an opposite perimeter of the region of interest.

4. The method of claim 3 wherein the velocity at which the detector is translated is varied as a function of the transverse position of the detector.

5. The method of claim 3 wherein the camera includes a third detector.

6. The method of claim 2 wherein the first and second detectors are disposed in a 90 degree configuration.

7. The method of claim 1 wherein the first and second detectors each generate a signal indicative of an x,y position on the face of the detector at which radiation is detected.

8. The method of claim 1 further including reconstructing a plurality of parallel image slices indicative of the detected radiation.

9. The method of claim 1 further including rotating the first and second detectors about the examination region so that the first detector is located at a first projection angle and the second detector is located at a second projection angle;

utilizing the first detector to detect radiation indicative of radionuclide decays occurring within the examination region, a first portion of the region of interest being located outside of the first detector's field of view;

rotating the first and second detectors about the examination region so that the second detector is located at the first projection angle;

positioning the second detector so that the first portion of the region of interest is within the second detector's field of view;

utilizing the second detector to detect radiation indicative of radionuclide decays occurring within the examination region.

10. The method of claim 9 wherein the first and second detectors are disposed in a 180 degree opposed configuration.

11. The method of claim 9 including with the second detector located at the second projection angle, utilizing the second detector to detect radiation indicative of radionuclide decays occurring within the examination region, a second portion of the region of interest being located outside of the second detector's field of view;

rotating the first and second detectors about the examination region so that the first detector is located at the second projection angle;

positioning the first detector so that the second portion of the region of interest is within the first detector's field of view;

utilizing the second detector to detect radiation indicative of radionuclide decays occurring within the examination region.

12. The method of claim 1 further including estimating a radiation attenuation of the object as a function of transverse position and coordinating the transverse motion of the detectors so as to vary the transverse sensitivity of the detectors as a function of the estimated attenuation.

13. A gamma camera including a first radiation sensitive detector having a radiation sensitive face which faces an examination region and having a transverse field of view;

a second radiation sensitive detector having radiation sensitive face which faces the examination region and having a transverse field of view, the first and second detectors being disposed in a relative angular position with respect to the examination region;

means for rotating the first and second detectors about the examination region so as to detect radiation with the detectors located at a plurality of projection angles;

means for translating the first and second detectors in a transverse direction in coordination with the rotation of the detectors about the examination region so that the effective transverse fields of view of the first and second detectors are greater than their actual transverse fields of view;

means for reconstructing an image indicative of the detected radiation.

14. The gamma camera of claim 13 including means for translating the first detector between a first position wherein the first detector's transverse field of view extends to at least a perimeter of the region of interest and a second position wherein the first detectors transverse field of view extends to at least an opposite perimeter of the region of interest and means for translating the second detector between a first position wherein the first detector's transverse field of view extends to at least a perimeter of the region of interest and a second position wherein the first detector's transverse field of view extends to at least an opposite perimeter of the region of interest.

15. The gamma camera of claim 13 wherein the detectors are disposed in a 180 degree opposed configuration.

16. A gamma camera including a first radiation sensitive detector having a radiation sensitive face which faces an examination region and having a transverse field of view;

a second radiation sensitive detector having radiation sensitive face which faces the examination region and having a transverse field of view, the first and second detectors being disposed in a relative angular position with respect to the examination region;

means for rotating the first and second detectors about the examination region so as to detect radiation with the detectors located at a plurality of projection angles;

means for translating the first and second detectors in a transverse direction in coordination with the rotation of the detectors about the examination region so as to increase the effective transverse field of view of the first and second detectors;

means for reconstructing an image indicative of the detected radiation; and a third detector having a radiation sensitive face which faces the examination region.

17. A diagnostic imaging method utilizing a gamma camera having a detector which includes a radiation sensitive face which faces an examination region and which has a transverse field of view, the method comprising:

utilizing the detector to detect radiation indicative of radionuclide decays occurring within the examination region;

rotating the detector about the examination region repeating the steps of utilizing and rotating a plurality of times so as to detect radiation with the detector located at a plurality of projection angles;

at a plurality of the projection angles, detecting radiation with the detector located at first and second transverse positions such that the effective transverse field of view of the detector is greater than the actual transverse field of view of the detector;

generating an image indicative of the detected radiation.

18. The method of claim 17 wherein the detector generates a signal indicative of the x,y position on the face of the detector at which radiation is detected.

19. The method of claim 17 further including a parallel hole collimator disposed between the radiation sensitive face and the examination region.

20. The method of claim 17 wherein the step of detecting radiation with the detector located at first and second transverse positions includes detecting radiation while translating the detector between the first and second transverse positions at a constant velocity.

* * * * *